June 10, 1924.
C. C. RICH
STORAGE BATTERY
Filed Aug. 9, 1922
1,496,829
2 Sheets-Sheet 1
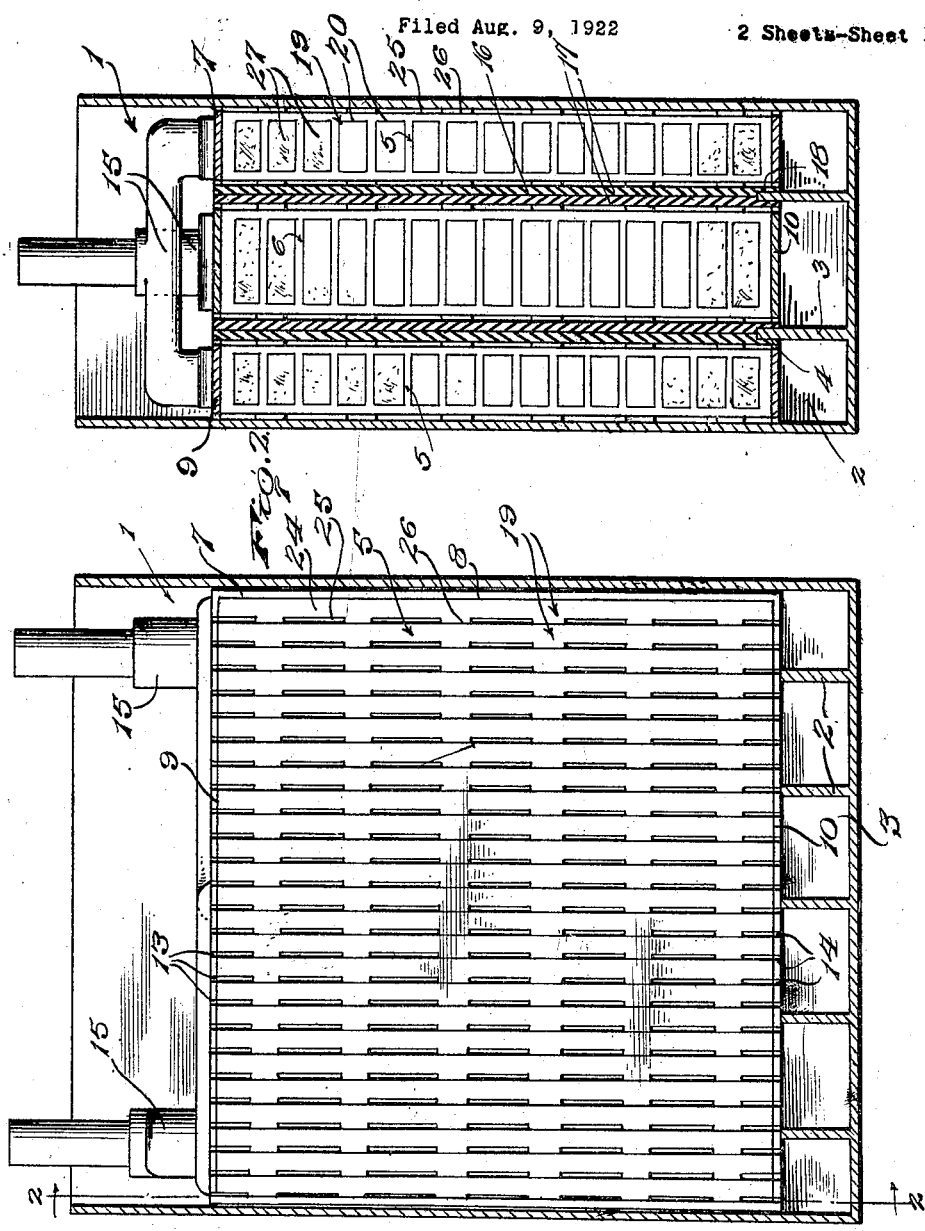
Inventor
C. C. Rich.
By
Lacey & Lacey, Attorneys

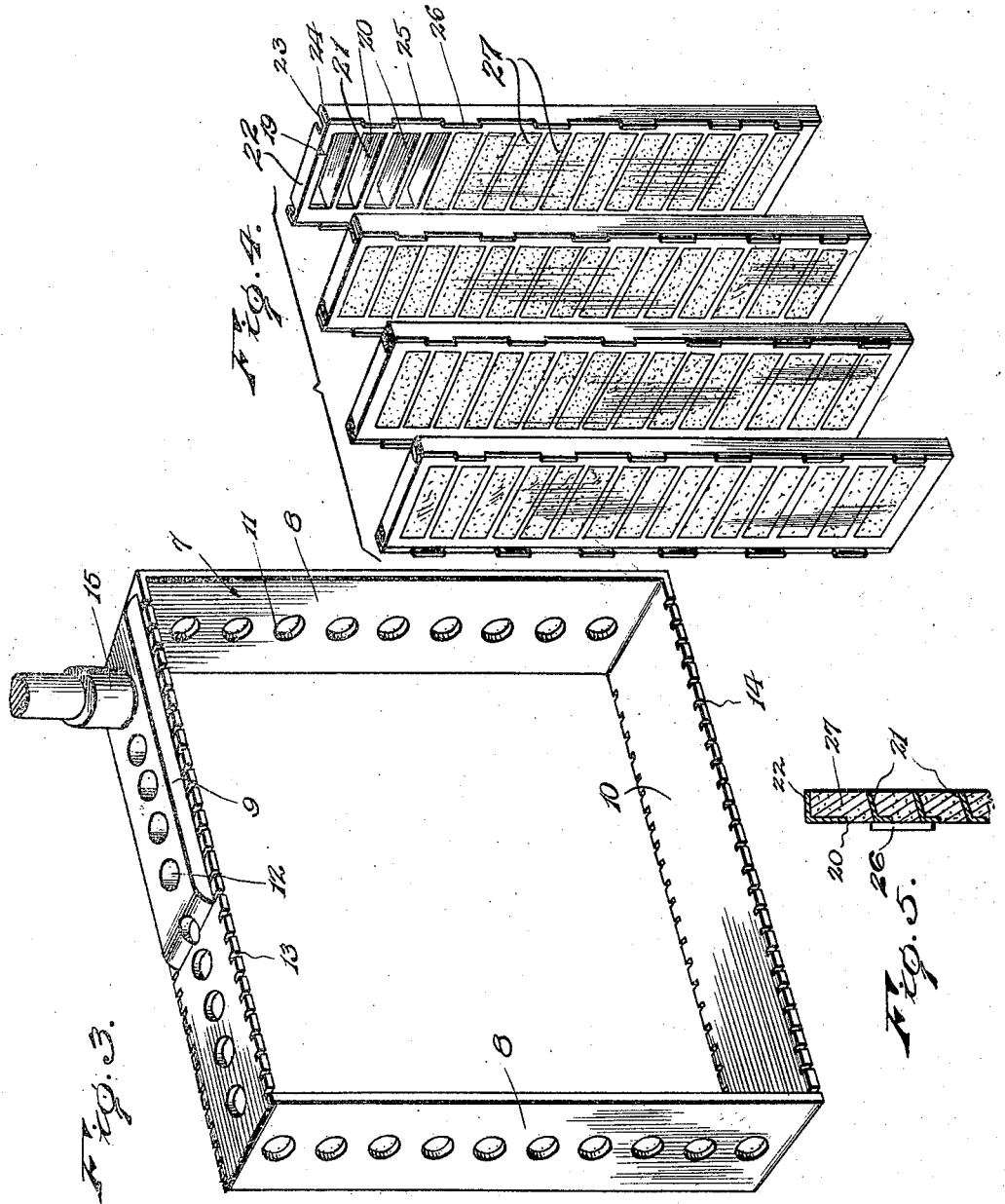

Patented June 10, 1924.

1,496,829

UNITED STATES PATENT OFFICE.

CHARLES C. RICH, OF MOUNT VERNON, NEW YORK, ASSIGNOR OF ONE-TWENTIETH TO CHARLES WINTERMEYER, OF MOUNT VERNON, NEW YORK.

STORAGE BATTERY.

Application filed August 9, 1922. Serial No. 580,789.

*To all whom it may concern:*

Be it known that I, CHARLES CLAYTON RICH, a citizen of the United States, residing at Mount Vernon, in the county of Westchester and State of New York, have invented certain new and useful Improvements in Storage Batteries, of which the following is a specification.

This invention relates to improvements in storage batteries.

The primary object of the present invention is to provide a storage battery which will be more durable than batteries of the ordinary constructions. The standard type of storage battery embodies grids in the nature of rigid rectangular frames in which is compressed a filling of the active material. Under conditions of use, the filling will contract while the battery is under charge and will expand when the battery is being discharged. It is a well known fact that when the battery has been discharged below the safety limit, the expansion of the active material takes place to an even greater degree, with the result that the grids become buckled or dished so that the corners thereof are liable to penetrate the porous separators thus bringing into contact grids of different polarity and causing an internal short circuiting of the battery. This buckling of the grids is due partly to the fact that their frames are relatively rigid and cannot therefore yield to compensate for the expansion and contraction of the filling of active material, and partly to the fact that, the grids being of considerable area, the expansive force is cumulative as it acts in the direction of the margins of the frames. Therefore, it is an important object of the invention to provide a storage battery embodying plates of such construction as to practically positively preclude any buckling or distortion which would result in internal short circuiting of the battery, and in this connection the invention contemplates providing a battery plate which, while strong and substantial in its structure, will yet possess a desirable degree of flexibility thus compensating for the expansive and contractive forces created in the discharging and charging of the battery.

Another equally important object of the invention is to so construct the component parts of the battery that the possibility of short circuits and internal discharge will be reduced to the minimum, and the battery will offer low internal resistance.

Another important object of the invention is to so construct the plates of the battery that they will present a maximum area of active material within a minimum space and insure a high rate of discharge.

Briefly stated, the invention contemplates a battery plate comprising a frame, and an assemblage of grids arranged therein, and it is another important object of the invention to so construct and assemble these grids that the individual grids will possess a desirable degree of flexibility to compensate for the varying stresses imposed during the periods of charging and discharging.

Another object of the invention is to so arrange and space the grids comprising each plate that the active material will have a desirable degree of freedom in expanding without any likelihood of distorting the individual grids or the plate as a whole, and the invention further contemplates that this spacing of the grids shall be effected in such a manner as to provide for free circulation of the electrolyte within the battery cell and free movement and escape of the generated gases.

Another important object of the invention is to provide for a maximum surface area of active material in a minimum space so that the battery as a whole will be much more compact than batteries of the ordinary types.

Another object of the invention is to so construct the component parts of the battery that when it is found expedient to make repairs, they may be effected with great facility.

The invention also has as its object to provide a battery which may be manufactured at a lower cost than batteries of ordinary construction and the parts thereof assembled with greater facility.

In the accompanying drawings:

Figure 1 is a vertical longitudinal sectional view through a battery constructed in accordance with the invention, one of the battery plates being shown in side elevation;

Figure 2 is a vertical transverse sectional view substantially on the line 2—2 of Figure 1;

Figure 3 is a perspective view of the frame of one of the plates;

Figure 4 is a group perspective view illustrating an assemblage of the grids removed from the frame;

Figure 5 is a detail vertical sectional view through the upper end portion of one of the said grids.

In the drawings the battery jar is indicated in general by the numeral 1 and the same is formed of glass or any of the other materials customarily employed for this purpose, and is provided in its bottom with transversely extending partitions 2 which are designed to support the plates in the well-known manner. In addition to the transverse partitions 2 the jar is provided with longitudinal partitions 3 which intersect the partitions 2 and which at their upper edge portions project beyond the upper edges of the partitions 2 as indicated by the numeral 4.

Figures 1 and 2 illustrate an example of a battery cell produced in accordance with the invention, and the same, in the illustrated embodiment, comprises negative plates 5 and a positive plate 6, the plates 5 being in this instance two in number and arranged at opposite sides of the plate 6. In such an arrangement the plates 5 may be of considerably less thickness than the plate 6 as shown most clearly in Fig. 2. The plates are of counterpart construction and each comprises a frame which is indicated in general by the numeral 7 and which comprises ends 8, a top 9, and a bottom 10, the frame being rectangular and formed of lead or any other suitable metal. The frame is open at its opposite sides to permit of the assemblage of the plates within the frame and their removal therefrom for repairs when occasion requires, and in order to provide for free circulation of the electrolyte, openings 11 and 12 are formed in the ends 8 and top 9 of the frame respectively, the lateral edges of the top 9 and bottom 10 being respectively provided with notches 13 and 14 arranged in longitudinal series and providing not only for the circulation of the electrolyte but also for the escape of the generated gases. Binding posts or terminals 15 are connected at the upper sides of the plate frames 7 for the connection of the conductor wires. By reference to Figure 2 of the drawings it will be observed that the plate frames 7 are to be assembled within the battery jar with their bottoms 10 resting upon the upper edges of the partitions 2, separators 16 being interposed between the adjacent sides of adjacent ones of the plates. Each of these separators comprises a pair of plates of rubber or other insulating material 17 which constitute the subject-matter of my co-pending application, filed August 9, 1922, Serial No. 580,790, and which therefore need not be specifically described herein. The opposing faces of the plates 17 along their lower edges are rabbeted as at 18 so as to provide grooves at the lower edges of the separators to receive the projecting upper edge portions 4 of the longitudinal partitions 3 thereby sealing the joint between the partitions and separators so as to prevent the active material precipitated from plates of different polarity accumulating in a manner to bridge the plates and cause internal short circuiting.

As the grids of the positive and negative plates are of counterpart construction, a description of one will suffice for all. Each of said grids comprises a foundation indicated in general by the numeral 19 and formed from a plate preferably of lead which is acted upon by a stamping machine or in any other approved manner to form a plurality of transverse openings 20 arranged one above another throughout the height of the plate. The material which is stamped out from the plate in forming these openings 20 provides supporting flanges or ledges indicated by the numeral 21 and these ledges are located at the lower sides of the openings 20 and are preferably inclined upwardly at a slight angle to the horizontal. The upper and lower ends of the plate are overturned to project from that face of the plate from which the flanges or ledges 21 project, so as to provide upper and lower supporting retaining flanges indicated by the numeral 22. The lateral portions of each plate are bent to form flanges 23 projecting likewise from the said face of the plate and turned back upon themselves as at 24. The edges of the back-turned portions of the flanges 23 are recessed at intervals as at 25 to provide lugs 26 which project from the plane of the opposite face of the plate, the lugs upon one plate being designed to abut against the flanges of a companion plate associated therewith and thus constituting means for properly spacing the faces of the grids. The numeral 27 indicates a filling of an electro-active material which is applied in paste form to that side of the foundation plate 19 from which the flanges 22 and 23 and the supporting ledges 21 project, the filling, upon hardening, being retained in place by the said flanges 22 and 23 and being additionally supported by the ledges 21. By slightly upwardly inclining these ledges, the material is not only afforded substantial support, but likewise it is restrained from dropping out of place. It will be observed that a portion of the filling enters the openings 20 so that the electro-active material is presented at both surfaces of the grid.

In building up the plate, a suitable number of the grids 5 or 6 as the case may be, are arranged in assembled relation within the frame 7, being suitably spaced by the lugs 26, as previously described, and the grids are suitably secured in place by spot burning; the top and bottom members of the frame, in this process, being touched at points opposite the upper and lower ends of each grid. Also it is preferable that the grids be spot burned at one or more points where their lugs touch one another so as to relatively unite and brace the grids. While the grids are in this manner secured in place and a direct and positive electrical contact is established between each of them and the frame in which they are mounted, it will be evident that it will not be a difficult matter to remove any one of the grids from the frame if it requires repair and it is considered advisable to make such repair rather than discard the entire plate or the battery.

From the foregoing description of the invention it will be evident that a battery constructed in accordance therewith will be more durable than batteries of the ordinary constructions because of the substantial character of the grids comprising each of the battery plates, and it will, furthermore, be evident that ample provision is made for expansion of the active material so that it is unlikely that there will be any buckling of the grids individually or of the plates as a whole. Also it will be evident that the stresses incident to expansion of the electro-active material are minimized because of the relatively small size of each grid although, considering an assemblage of the grids as a unit, a maximum surface area is presented to the electrolyte. Another important feature resides in the fact that by spacing the grids in the manner explained or in any equivalent manner, not only is provision made for free expansion of the electro-active material, but, furthermore, there may be perfect freedom of circulation of the electrolyte and a free passage and escape afforded the gases generated within the battery.

It will be understood, of course, that any desired number of the positive and negative plates may be provided.

If desired, instead of securing the grids in place within the frame by a process of spot burning, the frame may be cast about the assemblage of grids.

While the grid foundations have above been described as formed by a process of stamping, it will be understood that they might equally as well be formed by casting.

Having thus described the invention, what is claimed as new is:

1. A storage battery plate comprising a supporting frame, the frame being open at its opposite sides, a plurality of grid elements assembled together within the frame and each comprising a foundation and a filling of electro-active material, and spacing elements upon the sides of the foundations engaging adjacent ones of the grid elements, when assembled, for the purpose of relatively spacing the surfaces thereof.

2. A storage battery plate comprising a frame open at one side, and an assemblage of grid elements supported within the frame, the frame being perforate whereby to provide for the circulation of the electrolyte.

3. A storage battery plate comprising a frame open at one side, and an assemblage of grid elements supported within the frame, the top and bottom members of the frame being provided with passages for the generated gases.

4. A storage battery plate comprising a frame open at one side, and an assemblage of grid elements supported within the frame, the longitudinal edges of one of the frame members being provided with a series of notches to permit of the passage of the generated gases past said frame member.

5. A storage battery grid element comprising a metallic plate provided with a plurality of transverse openings arranged one above another, means at the lower sides of the openings for the support of an electro-active filling material, the plate being provided with side flanges to confine said material, said plate being provided also with lugs adapted to engage a companion plate assembled therewith whereby to suitably space the adjacent surfaces of said plates.

6. A storage battery plate comprising a frame consisting of a top, bottom, and ends, the frame being open at its opposite sides, and a plurality of independent grid elements maintain in assembled relation within the frame between the open sides thereof and each comprising a foundation and a filling of an electro-active material, the grid elements being disposed in upright position extending between the top and bottom members of the frame.

7. A storage battery plate comprising a frame consisting of top, bottom, and end members, the frame being open at its opposite sides, a plurality of independent grid elements assembled together in facially opposed relation within the frame and each comprising a foundation and a filling of electro-active material, the said grid elements being disposed in upright position within the frame, and projections arranged at intervals along the margins of the said grid elements constituting a means for mutually spacing the said grid elements.

8. A storage battery grid element comprising a metallic plate having side flanges projecting beyond the plane of one face thereof and extending along the vertical longitudinal edges of the said plate, the plate having portions removed to provide transverse substantially rectangular openings extending substantially the entire width of the plate and arranged in parallelism one above another, the portions of the plate which are removed to form the openings being struck out beyond the plane of the said face of the plate to provide transverse ledges extending between the said side flanges, the said ledges and side flanges constituting means for supporting and retaining the active material of the grid element.

In testimony whereof I affix my signature.

CHARLES C. RICH.